United States Patent
Löffler

(10) Patent No.: US 9,063,231 B2
(45) Date of Patent: Jun. 23, 2015

(54) METHOD AND DEVICE FOR IMAGING AN OBJECT USING ELECTROMAGNETIC HIGH FREQUENCY RADIATION

(75) Inventor: Torsten Löffler, Glasshütten (DE)

(73) Assignee: Hubner GmbH, Kassel (DE)

( * ) Notice: Subject to any disclaimer, the term of this patent is extended or adjusted under 35 U.S.C. 154(b) by 1057 days.

(21) Appl. No.: 13/132,229

(22) PCT Filed: Nov. 27, 2009

(86) PCT No.: PCT/EP2009/065994
§ 371 (c)(1),
(2), (4) Date: Jun. 1, 2011

(87) PCT Pub. No.: WO2010/063654
PCT Pub. Date: Jun. 10, 2010

(65) Prior Publication Data
US 2011/0234808 A1 Sep. 29, 2011

(30) Foreign Application Priority Data
Dec. 2, 2008 (DE) .......................... 10 2008 059 932

(51) Int. Cl.
*G01S 13/88* (2006.01)
*G01S 13/42* (2006.01)
*G01S 13/89* (2006.01)

(52) U.S. Cl.
CPC ............ *G01S 13/887* (2013.01); *G01S 13/426* (2013.01); *G01S 13/89* (2013.01)

(58) Field of Classification Search
CPC ...... G01S 13/887; G01S 13/89; G01S 13/426
USPC .................................................. 342/22, 179
See application file for complete search history.

(56) References Cited

U.S. PATENT DOCUMENTS

| 4,344,666 | A | * | 8/1982 | Birgmeir et al. | ............ 359/220.1 |
| 5,248,977 | A | * | 9/1993 | Lee et al. | ...................... 342/25 F |
| 5,859,609 | A | | 1/1999 | Sheen | |
| 6,417,502 | B1 | * | 7/2002 | Stoner et al. | ................ 250/208.1 |
| 7,415,244 | B2 | * | 8/2008 | Kolinko et al. | ................... 455/25 |
| 7,982,656 | B2 | * | 7/2011 | Coward et al. | ................... 342/22 |
| 8,531,650 | B2 | * | 9/2013 | Feldkhun et al. | ............ 356/4.01 |

(Continued)

FOREIGN PATENT DOCUMENTS

| DE | 10 2005 042 463 A1 | 3/2007 |
| DE | 10 2006 012 715 B4 | 9/2007 |

(Continued)

OTHER PUBLICATIONS

Vaskelainen L. I. et al.; "Array-fed parabolic-cylindrical reflector antenna for multifunction surveillance radar" RADAR '97. Edinburgh, Oct. 14-16, 1997; [IEE Conference Publication], London: IEE, GB, Bd. No. 449, Oct. 14, 1997, Seiten 379-382, XP006508972; ISBN: 978-0-85296-698-3 das ganze Dokument.

(Continued)

*Primary Examiner* — Matthew M Barker
(74) *Attorney, Agent, or Firm* — Drinker Biddle & Reath LLP

(57) ABSTRACT

A device for imaging an object by electromagnetic high frequency radiation including at least one detector for electromagnetic high frequency radiation and at least one imaging device for generating a focus. To provide a device for and a method of imaging an object by electromagnetic high frequency radiation, which makes it possible to detect even a rapidly moving object with a high level of resolution, it is proposed that the device has at least one controllable element for changing the beam direction, which is so adapted that the focus of the imaging device is movable.

12 Claims, 2 Drawing Sheets

(56) References Cited

U.S. PATENT DOCUMENTS

| | | |
|---|---|---|
| 2001/0013839 A1 | 8/2001 | Wurman et al. |
| 2007/0046525 A1 | 3/2007 | Holbrook et al. |
| 2008/0110093 A1* | 5/2008 | Liles .............................. 49/42 |
| 2008/0211713 A1 | 9/2008 | Jeck |
| 2009/0200467 A1* | 8/2009 | Gray et al. .................... 250/332 |
| 2010/0295725 A1 | 11/2010 | Krozer |

FOREIGN PATENT DOCUMENTS

| | | |
|---|---|---|
| DE | 10 2007 045 103 A1 | 4/2009 |
| GB | 2 034 554 A | 6/1980 |
| JP | H10-160837 | 6/1998 |
| WO | 2005/017559 A2 | 2/2005 |

OTHER PUBLICATIONS

Soumekh, Mehrdat, "Fourier Array Imaging", Prentice Hall, PTR, edition: Jan. 1994, ISBN—10:0130637696, 10 pages.

English translation of the International Preliminary Report on Patentability from corresponding International application No. PCT/EP2009/065994, mailing date Jun. 16, 2011, 14 pages.

* cited by examiner

METHOD AND DEVICE FOR IMAGING AN OBJECT USING ELECTROMAGNETIC HIGH FREQUENCY RADIATION

RELATED APPLICATION DATA

This application is a §371 National Stage Application of PCT International Application No. PCT/EP2009/065994 filed Nov. 27, 2009, and also claims priority under 35 U.S.C. §119 and/or §365 to German Application No. 10 2008 059 932.8, filed Dec. 2, 2008.

TECHNICAL FIELD

The present invention concerns a device for imaging an object by means of electromagnetic high frequency radiation comprising at least one detector for electromagnetic high frequency radiation and at least one imaging device for generating a focus.

The invention further concerns a method of imaging an object by means of electromagnetic high frequency radiation comprising the steps: imaging the object onto at least one detector with an imaging device which generates a focus, and detecting the imaging with the detector.

The terahertz frequency range (THz) is one of the last of the "dark" frequency ranges in the electromagnetic spectrum, that is to say radiation sources and receivers can hitherto be obtained only with difficulty for that frequency range. Therefore the applications of electromagnetic radiation in that frequency range are previously limited to fields which are close to research, such as for example radioastronomy or material sciences. In that respect the THz frequency range offers considerable advantages over other frequency ranges in the electromagnetic spectrum:

- many optically opaque materials are transparent in the THz frequency range,
- THz radiation is non-ionising and is therefore deemed to be safe in the biomedical field,
- given rotary, translatory or vibronic molecular excitations have a resonance frequency in the THz frequency range,
- THz radiation affords essential items of information about charge carrier dynamics, in particular in nanostructures, which play an essential part in future photonic and electronic components,
- THz radiation exhibits a low degree of scatter compared to optical frequencies and is therefore suitable in particular for use in industrial environments in which for example increased dust formation is involved, and
- if communication systems are considered higher frequencies permit greater transmission band widths.

BACKGROUND

Attempts have been made for some time to make the THz frequency range available for imaging applications, in particular in security technology for checking and inspecting people.

U.S. Pat. No. 5,859,609 discloses a device for holographic approximated real time imaging of concealed articles by means of THz radiation. A vertical linear antenna arrangement is moved over a circular path to achieve cylindrical scanning of 360° of a covered target such as for example a clothed person. The data are present in the form of a non-focused millimeter wave illumination which is capable of reaching a covering such as for example of a clothed person and which is capable of penetrating a covering such as for example clothing. The millimeter wave illumination has to be focused or reconstructed mathematically, that is to say by computation, into recognisable images.

Such a device suffers from the disadvantage that for producing imaging of a three-dimensional article by means of a synthetic aperture in two dimensions on the one hand a large number of sources and detectors are required in a first direction and in addition the arrangement of sources and detectors has to be moved completely around the object in order also to be able to generate an image with a synthetic aperture in a second direction perpendicular to the row of sources and detectors. That is linked on the one hand to high costs by virtue of the large number of sources and detectors required, but on the other hand it also involves a comparatively long measurement time as the entire arrangement must be rotated once though 360° in a circle, for example for recording a complete person.

SUMMARY

In comparison with that state of the art the object of the present invention is inter alia to provide a device and a method of imaging an object by means of electromagnetic high frequency radiation, which avoid at least one of the aforementioned disadvantages.

According to the invention that object is attained by a device for imaging an object by means of electromagnetic high frequency radiation comprising at least one detector for electromagnetic high frequency radiation and at least one imaging device for generating a focus, the device having at least one controllable element for changing the beam direction, which is so adapted that the focus of the imaging device is movable.

In that respect the imaging device in accordance with the present application, in an embodiment, can be an imaging system having a fully synthetic aperture which manages without optically focusing elements and which generates the focus only mathematically, that is to say by computation.

In a preferred embodiment the imaging device is an imaging optical system, that is to say a refractive or reflecting element, which produces an optical imaging at least in one dimension. Focusing of the electromagnetic radiation used, with an optical system, in at least one dimension, means that the number of detectors to be used can be considerably reduced at least in one direction in comparison with a fully synthetic system because portion-wise detection of the object is effected by moving the focus of the imaging optical system over the object.

In accordance with the present invention electromagnetic radiation in a frequency range of 800 MHz to 10 THz, that is to say in an expanded THz frequency range, is referred to as high frequency or THz radiation. Preferably the frequencies used for imaging are in a range of 30 GHz to 1 THz and are particularly preferably about 100 GHz. At those frequencies large differences occur in the reflection and transmission characteristics of various materials, which play a part for example in monitoring people. Metal, for example the surface of a firearm or stabbing weapon has a high level of reflectivity in that frequency range while biological material, for example the surface of the skin of the person bearing the weapon, has pronounced absorption windows in that frequency range.

In that respect the controllable element for changing the beam direction can be both a mechanical arrangement which moves the detector and the imaging device as a whole so that the focus of the imaging device can be oriented.

However, preferred embodiments are those in which the controllable element for changing the beam direction is an optical element, in particular a mirror or a lens. In that respect in an embodiment of the invention the controllable optical element for changing the beam direction can be a constituent part of the imaging optical system.

Although the device according to the invention can be in the form of a passive system, that is to say without a source for the electromagnetic radiation, in an embodiment it has at least one source for electromagnetic radiation, wherein the source is preferably a source for electromagnetic high frequency radiation in a frequency range of 800 MHz to 10 THz and particularly preferably in a frequency range of 30 GHz to 1 THz.

Conventional imaging devices for producing the image of an object, by virtue of the specular character of the objects to be imaged, require a large numerical aperture for producing an image with a high resolution. That requirement however can be met by small optical systems which are moved rapidly for scanning the object, only while tolerating major image defects. To get round that problem an embodiment of the invention provides that the imaging device but in particular the imaging optical system is so adapted that it forms a multiplicity of mutually spatially separated beam paths, the foci of which are at a multiplicity of mutually different locations and in addition the controllable element for changing the beam direction is so adapted that the foci of the mutually separate beam paths are spatially movable.

In that way the object can be scanned at a plurality of mutually separate locations over a region, wherein the individual mutually separate regions can be scanned with optical systems of a small aperture and the image is later assembled from the multiplicity of scanned regions. In that respect regions between the scanned regions of the object, that are detected by the foci, are preferably interpolated.

In particular it is advantageous in that respect if the spatially separate beam paths in an embodiment are so oriented that they "view" the object from different viewing directions. In other words the spatially separate beam paths at their incidence at an object include an angle of greater than 0° with each other (also 180°, that is to say in mutually opposite relationship). In other words they are not parallel to each other.

In another embodiment of the invention that is simple to implement the device has precisely one source and one detector. In that respect an interconnected arrangement of a plurality of emitting elements for the electromagnetic radiation is also interpreted as the source. The detector in accordance with the present invention can also be an interconnected arrangement of a plurality of receivers for the electromagnetic radiation.

An arrangement of the device according to the invention with precisely one source and one detector, which has a multiplicity of mutually spatially separate beam paths, the foci of which are at a multiplicity of mutually different locations, desirably has in an embodiment at least one respective focusing element in each of the mutually spatially separate beam paths.

In an alternative configuration of such an arrangement each of the spatially separate beam paths respectively has a source and a detector so that the arrangement has an identical number of sources and detectors.

As an alternative to an embodiment having a respective focusing element for each beam path focusing of the high frequency radiation generated by a source can initially be effected, which is then subsequently divided to the plurality of mutually spatially separate beam paths, for example by a beam divider.

In an embodiment of the invention the controllable element for changing the beam direction is a surface of a door member of a revolving door, which surface is reflective for the electromagnetic high frequency radiation to be detected. Such an arrangement has the advantage that it makes it possible for people who for example pass into a building or a part of a building through a revolving door to be detected and inspected without necessarily being aware of that. In that respect, for the element for changing the beam direction, with the door member of the revolving door, it is possible to have recourse to an element which is present in any case and is mechanically driven. In another embodiment the reflecting surface of the door member of the revolving door is metallically coated to provide adequate reflectivity for the high frequency radiation used.

In an embodiment of the invention the movable optical element is a body with a polygonal, preferably triangular base surface of which at least one side surface forms a mirror for the high frequency radiation used and which is rotatable about an axis. Such an arrangement permits rapid scanning of a surface region of the object, that is to be detected, as deflection is achieved by a rotary movement.

In an embodiment of the invention the mutually spatially separate beam paths all have a mutually different optical travel length between the object and the detector or between the source, the object and the detector so that, when using precisely one source and one detector for all beam paths the retroreflections of the individual foci of the beam paths are time-coded.

Alternatively or additionally, in embodiments in which each of the beam paths has at least one respective movable optical element, the optical elements are so adapted that at a given moment in time only one of the movable optical elements transmits electromagnetic radiation to the detector. An example of that is an arrangement having three mutually spatially separate beam paths in which a respective rotating mirror body of triangular cross-section is provided in each of the three beam paths, wherein only one of the three side surfaces of each mirror body has respective reflecting properties while the other two sides of the mirror body are respectively absorbent.

If in an embodiment having a plurality of mutually spatially separate beam paths there is provided at least one movable optical element, preferably such a mirror body as described hereinbefore, in each of the separate beam paths, and in addition there is a further movable beam-deflecting element which is moved at a low speed, for example the reflecting surface of a door member of a revolving door, then with the rapid movement of the mirror bodies an equal plurality of small surface portions of the object can be rapidly scanned while the slow movement of the second beam-deflecting element, that is to say that of the revolving door, provides that different regions of the object are successively scanned.

In a preferred embodiment of the invention the detector has at least two receivers or pixels so arranged that they form a row, wherein the device has a control means or evaluation device which is so adapted that the receivers can be operated in such a way that in a direction parallel to the row they produce imaging with a synthetic aperture and wherein the imaging device is an imaging optical system so adapted that it produces optical imaging only in planes substantially normal to the rows.

Such a device represents a hybrid system which in a first direction or dimension produces conventional optical imaging by means of an imaging optical system while in a second direction or dimension perpendicular thereto it affords the advantages of synthetic aperture imaging.

The principle of synthetic aperture imaging which is frequently also referred to as synthetic imaging is that of replacing the snapshot of an antenna involving a large aperture by a plurality of time-successive recordings of a moved antenna or a moved objective of small aperture or also by a plurality of time-successive recordings of a plurality of stationary antennas of a small aperture.

In an embodiment of such a hybrid system the device according to the invention has a source having at least a first and a second emitting element for electromagnetic high frequency radiation, which are arranged together with the receivers of the detector in such a way that they form a row with emitting elements and receivers. In that case the arrangement provides for illumination of the object with the radiation emitted by the emitting elements, in an embodiment, with the same imaging device and in particular the same imaging optical system which serves to image the radiation onto the receivers.

In that respect the hybrid system according to the invention is not limited to two emitting elements or receivers but in embodiments has more than two emitting elements and/or receivers.

In accordance with the present application the term row is used to denote an arrangement of the emitting elements and/or receivers, in which the emitting elements and/or receivers are arranged along a straight line. That means that the arrangement of emitting elements and/or receivers is of a greater extent in one direction than in the direction perpendicular thereto. A row in accordance with the present invention however does not exclude each column of the row having more than one emitting element or receiver. That means also that for example arrangements of 2×4 or 4×20 emitting elements or receivers are considered as a row as long as the arrangement is of a greater extent in one direction than in the direction perpendicular thereto.

When the description of the present invention refers to the imaging optical system being so adapted that it causes optical imaging only in the plane substantially perpendicular to the row, that means that for example beams incident on the imaging optical system in parallel relationship are only deflected in the plane perpendicular to the row in such a way that they are focused onto a line behind the imaging optical system.

In an embodiment of the invention the imaging optical system has a cylindrical optical system. Such cylindrical optical systems are astigmatic in the ideal sense, that is to say they produce only optical imaging in planes perpendicular to their cylinder axis. Such cylindrical optical systems are therefore particularly suitable for use in devices according to the present invention as, when their cylinder axis extends substantially parallel to the row of emitting elements and/or receivers, they produce optical imaging in planes perpendicular to the row while they do not have any imaging effect in a direction parallel to their cylinder axis.

The term cylindrical optical systems in accordance with the present invention is used to denote optical systems whose refractive interfaces or reflecting surfaces are formed by the peripheral surface of a cylinder or the inside surface of a hollow cylinder or a surface segment therefrom. The main bodies for such cylindrical optical systems preferably involve right cylinders, the peripheral or inside surfaces of which are perpendicular to the base surfaces, wherein the base surfaces or inside cross-sectional areas are preferably formed by circles or ellipses. Optical systems with parabolic or hyperbolic surfaces are also included in cylindrical optical systems in the sense of the present invention, as long as they are astigmatics.

In an embodiment the row of emitting elements and/or receivers is arranged at a first focal point of a hollow-cylindrical optical system. If in an embodiment of the invention the hollow-cylindrical optical system has an elliptical inside cross-sectional area which defines the configuration of the reflecting inside surface of the body then the cylindrical optical system has two focal points.

If the cylindrical row of emitting elements and/or receivers is arranged in the first focal point so that the emitting elements and/or receivers point towards the reflecting surface of the hollow-cylindrical optical system then the electromagnetic radiation emitted by the radiation sources is focused by the elliptical mirror onto a (focal) line on the object. While the resolution of that imaging device in the direction perpendicularly to the arrangement of the row is achieved by the imaging effect itself, a synthetic aperture is calculated in a direction parallel to the row, and that synthetic aperture serves for image generation in that direction.

As an alternative to the described elliptical or parabolic hollow mirrors in embodiments of the invention the imaging optical systems can also be formed by cylindrical telescopes, for example cylindrical Cassegrain telescopes, Newton telescopes, Schmidt telescopes or hybrid forms thereof.

To be able to produce an image in a direction perpendicular to the row, an embodiment of the invention provides that the cylindrical optical system is pivotable about an axis parallel to the cylinder axis, that is to say also to the row of emitting elements and/or receivers. In that way an object can be scanned or rastered in a direction perpendicular to the row. The cylindrical optical system then simultaneously represents the controllable element for changing the beam direction in accordance with the present invention.

In a further embodiment of the invention the first emitting element for electromagnetic high frequency radiation is adapted to emit a first uniquely identifiable electromagnetic signal and the second emitting element for electromagnetic high frequency radiation is adapted to emit a second uniquely identifiable electromagnetic signal and the two receivers are so adapted that each of them receives substantially simultaneously and distinguishably the first and second signals.

In an embodiment of the invention the electromagnetic signals emitted by the individual emitting elements are uniquely encoded by means of the frequency of the emitted signals, that is to say they are to be distinguished from each other by their frequency. As in an embodiment there are no two emitting elements involving identical frequencies in respect of the respectively emitted electromagnetic signal, each signal received by a receiver can be uniquely associated with a single emitting element.

As each of the receivers simultaneously receives the first and second signals, a large aperture in the direction of the row of emitting elements and/or receivers can be synthesised from the received signals in a short time and an image in row form with a high level of resolution can be computed.

In accordance with this embodiment the reference to the frequency of the electromagnetic signals is used to denote the carrier frequency thereof and not for example their modulation frequency.

Alternatively to the described frequency encoding unique identifiability of the electromagnetic signals emitted by the individual emitting elements can also be effected by unique channel coding with the same carrier frequency, as is known from the mobile radio and communication field.

In a further embodiment of the invention the first and second receivers are coupled together in phase-locked relationship, irrespective of whether the radiation sources and the receivers are or are not coupled in phase-locked relationship.

Detection of the electromagnetic signals can be effected in that way interferometrically, wherein interferometric algorithms which take account of the phase differences in the electromagnetic signals between the individual receivers are used for image generation.

In addition in an embodiment the first and second receivers are phase-coupled to the radiation sources.

In that respect the device according to the invention is particularly suitable for the emission and reception of an electromagnetic continuous-wave signal (CW signal). In an embodiment the frequency of the emitted electromagnetic continuous-wave signals can be kept constant over the measurement time. Alternatively the frequency of the signals can be altered over the measurement time, provided that at no moment in time do two signals involve the same frequency or the same uniquely identifiable signature in order to permit a unique association of the individual signals received by the receivers with the respective emitting elements over the entire measurement time.

In an embodiment emission of the first and second signals is also effected substantially simultaneously. In spite of the simultaneous emission of the signals they can be uniquely associated with the emitting elements by virtue of the unique identifiability of the electromagnetic signals emitted by the individual emitting elements.

Computation of the image in row form in the direction of the arrangement in row form of emitting elements and/or receivers is effected by means of algorithms as are typically used for imaging processes with a synthetic aperture and for interferometric radar imaging or interferometric radioastronomy. In that case in an embodiment the principles of synthetic imaging are used in order to process the signals, received simultaneously by at least two receivers, of a single emitting element to afford a first synthetic image of a single virtual antenna having a large synthetic aperture. In that case that production of a synthetic image is also effected simultaneously for all further signals emitted by the other emitting elements.

Corresponding imaging algorithms are known for example from the book by Mehrdad Soumekh "Fourier Array Imaging", Prentice Hall, PTR, edition: January 1994, ISBN-10: 0130637696, the content of which insofar as it concerns the algorithms for imaging is entirely incorporated herein by reference. The processes described herein as synthetic aperture imaging for producing an image of the object are also referred to at another point in the literature as holographic imaging or interference imaging.

An embodiment which as described above has a first and a second emitting element, wherein the first emitting element is adapted to emit a first electromagnetic signal at a first frequency and the second emitting element is adapted to emit a second electromagnetic signal at a second frequency, wherein the first and second frequencies are different from each other and at least two receivers which are so adapted that each of them substantially simultaneously receives the first and second signals is described in German patent application DE 10 2007 045 103.4. In particular the arrangement of the at least one first and second emitting elements and the at least two receivers can be seen from the description of the above-indicated laid-open specification, but in particular the claims. In that respect the disclosure of DE 10 2007 045 103.4 is incorporated herein by reference with its entire disclosure.

At least one of the aforementioned objects is achieved by a method of imaging an object by means of electromagnetic high frequency radiation comprising the steps: imaging an object onto at least one detector with an imaging device, preferably an imaging optical system, which generates a focus, detecting the imaging with the detector and controlling an element which changes the beam direction so that the location of the focus of the imaging device is moved spatially over the object.

In addition in an embodiment the method according to the invention comprises the steps: imaging the object with a plurality of mutually spatially separate beam paths, the foci of which are at a plurality of mutually different locations, and controlling the element for changing the beam direction so that the foci of the mutually separate beam paths are spatially moved.

BRIEF DESCRIPTION OF THE DRAWINGS

Further advantages, features and possible uses of the present invention will be apparent from the description of embodiments hereinafter and the accompanying Figures.

DETAILED DESCRIPTION

Figure 1:
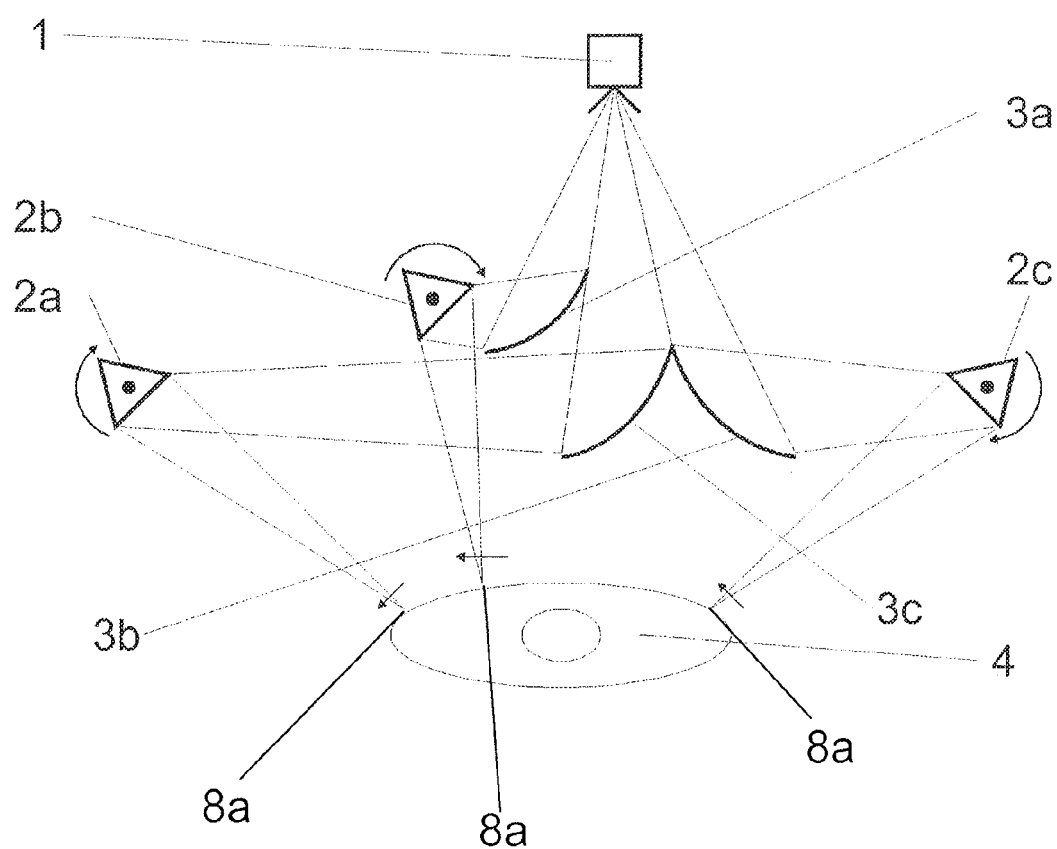
FIG. 1 shows a first embodiment of the device according to the invention for imaging an object.

The embodiment shown in FIG. 1 involves a so-called active system, that is to say the system has an illumination arrangement which illuminates the object to be detected with high frequency radiation which is then detected by a detector arranged in the same housing 1 as the source.

The arrangement 1 of source and detector has a plurality of emitting elements and receivers, the emitting elements forming the source and the receivers forming the detector. The row-shaped arrangement has emitting elements and receivers arranged in mutually juxtaposed relationship in an irregular sequence. In the illustrated embodiment the row has five emitting elements and receivers each. That affords a multiplicity of spacings between the emitting and receiving positions of the individual emitting elements and receivers. Thus good coverage in the k-space, wherein k is the inverse wave vector, is already achieved with a low number of emitting elements and receivers, in one dimension, that is to say in a direction in mutually juxtaposed relationship.

The row-form array of emitting elements and receivers in the illustrated embodiment is arranged in the first focal lines or foci of three elliptical hollow-cylinder mirrors 3a, 3b, 3c. In the diagrammatic plan view in FIG. 1 of the imaging device the configuration of the row of emitting elements and receivers is perpendicular to the plane of the sheet. In that direction, that is to say in the direction parallel to the row, the mirrors 3a-3c are not curved so that only astigmatic imaging is afforded in planes perpendicular to the row, that is to say in planes parallel to the plane of the paper of the view in FIG. 1, as in the case of a cylindrical lens.

In another embodiment which is an alternative thereto and which is not shown here the hollow-cylindrical mirrors 3a-3c can be replaced by corresponding cylindrical lenses, wherein the object would be arranged behind the lens as viewed from the source-detector arrangement 1.

The focusing mirrors 3a-3c are arranged in the emission wedge of the source-detector arrangement 1 in such a way that they respectively divide approximately a third of the total power of the source to three mutually spatially separate beam paths. Besides a first focal point which is disposed on the row of emitting elements and receivers in the source-detector arrangement 1 the focusing mirrors 3a-3c respectively produce a second focus or focal line 8a-8c which is so arranged that it comes to lie on the object 4 to be imaged.

The three mutually spatially separate beam paths respectively view the object 4 from different viewing directions.

In the illustrated embodiment the three separate beam paths are so selected that they each have mutually different optical travel lengths. In that way the three signal components reflected by the object can be distinguished by virtue of their transit time delay, that is to say their incidence in time-separated relationship on the receivers of the source-detector arrangement.

All three portions of the object can therefore be detected with the same receivers in the source-detector arrangement without involving mixing of the information of the individual portions.

A movable mirror element 2a-2c is arranged in each of the three beam paths. The mirror elements 2a-2c make it possible for the foci or focal lines 8a-8c to be moved independently of each other over the object and for the object to be respectively scanned over a portion thereof. In operation of the device a respective image is produced for each object portion scanned by the focal lines 8a-8c. The regions between the focal lines 8a-8c are then interpolated on the basis of different criteria in order in that way to obtain an image of the overall object 4.

Each of the partial images of the surface of the object 4, over which a focal line 8a-8c passes, represents in that case a combination of a "genuine" optical image in planes parallel to the surface of the paper in the view in FIG. 1, that is to say an image caused physically by the corresponding focusing element 3a-3c, and an image with a synthetic aperture in a direction perpendicular thereto (that is to say also perpendicular to the plane of the paper of the view in FIG. 1).

Synthetic aperture imaging is effected by means of suitable algorithms which allow evaluation of the measured signal amplitudes and phases, that is to say synthetic focusing parallel to the direction of the row. If transit time information, that is to say information about the phase position, is available, it is also possible to effect reconstruction of the information about the spacing of the object 4 from the source-detector arrangement 1.

By virtue of the fact that synthetic imaging is effected by means of the source-detector arrangement 1 in row form comprising emitting elements and receivers only in one dimension the demands both on the number of emitting elements and receivers and also on the computing power for reconstruction of the imaged surfaces of the object 4 in the object plane are markedly reduced in comparison with fully synthetic systems. In addition the signal-to-noise ratio of the arrangement is markedly improved in comparison with a fully synthetic system which computes a synthetic aperture in two spatial directions as a marked gain in signal is achieved at least in one dimension by virtue of imaging with the hollow mirrors 3a-3c.

Compared to a purely optical system, that is to say which images in two dimensions, the mirrors 3a-3c used for imaging of the respective object portions have a markedly larger numerical aperture and linked thereto a higher level of resolution. In that case, by virtue of the small spatial size of the mirrors 3a-3c, the image defects thereof are found to be markedly less than when imaging the entire object by means of a single optical system which has a numerical aperture comparable to the mirrors 3a-3c and which is used to scan the entire object 4.

Figure 2:
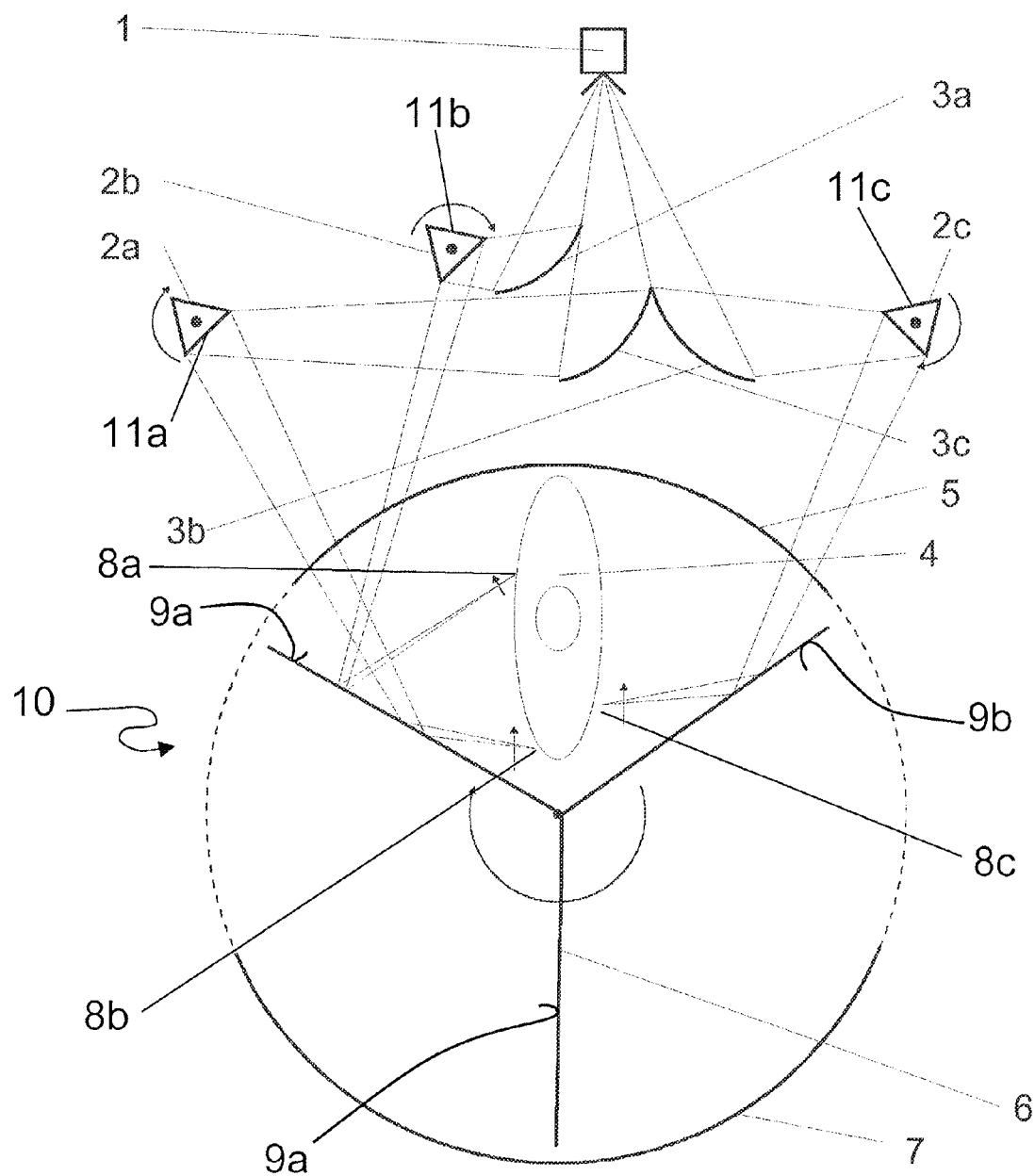
FIG. 2 shows a further embodiment of the device according to the invention for imaging an object.

While in a system having a structure as shown in FIG. 1 relatively large regions of the object 4 between the regions over which the focal lines 8a-8c pass on the surface of the object have to be interpolated, the alternative embodiment shown in FIG. 2 makes it possible to pass over larger regions of the object to be detected. In that case the elements identical to the arrangement of FIG. 1 are denoted by the same references in FIG. 2.

In addition to the rapidly rotating mirror arrangements 2a-2c in FIG. 1 in each of the three beam paths, there is still a further common reflecting movable element, namely the door member 6 of a revolving door 10, in the three beam paths in FIG. 2.

Such an arrangement can be used for example for detecting a person when entering a building through such a revolving door. While the focal lines 8a-8c pass rapidly over the object 4 due to the rapidly rotating mirror elements 2a-2c, the region over which the focal lines 8a-8c passes is continuously changed by the revolving door 10. The reflecting surfaces 9a-9c of the door members 6 of the revolving door 10, which rotate at a lower rotary speed compared to the reflecting elements 2a-2c, continuously change the viewing directions of the individual beam paths. In that way the regions of the surface of the object 4 that are to be interpolated between the regions over which the focal lines 8a-8c pass can be reduced.

The reflecting elements 2a-2c shown in FIGS. 1 and 2 comprise cylindrical bodies with triangular base surfaces so that they have three side surfaces. The mirror bodies 2a-2c are rotated about axes of rotation so that the reflecting surfaces are rotated through the respective beam path. A high scanning rate for each region over which the focal lines 8a-8c pass can be achieved by the pure rotary movement of the elements 2a-2c. In the illustrated embodiment only one respective side surface 11a-11c of each triangular mirror body 2a-2c is reflective for the high frequency radiation used while the other two side surfaces are absorbent for the high frequency radiation. It is possible in that way to ensure that only one respective beam path is active (unlike what is shown in FIGS. 1 and 2 for simplification of the drawing), that is to say it is transparent for the electromagnetic radiation. It is possible in that way to make an additional distinction between the signals of the three different object portions.

For the purposes of the original disclosure it is pointed out that all features as can be seen by a man skilled in the art from the present description, the drawings and the claims, even if they are described in specific terms only in connection with certain other features, can be combined both individually and also in any combinations with others of the features or groups of features disclosed herein insofar as that has not been expressly excluded or technical aspects make such combinations impossible or meaningless. A comprehensive explicit representation of all conceivable combinations of features is dispensed with here only for the sake of brevity and readability of the description.

While the invention has been illustrated and described in detail in the drawings and the preceding description that illustration and description is only by way of example and is not deemed to be a limitation on the scope of protection as defined by the claims. The invention is not limited to the disclosed embodiments.

Modifications in the disclosed embodiments are apparent to the man skilled in the art from the drawings, the description and the accompanying claims. In the claims the word "have" does not exclude other elements or steps and the indefinite article "a" does not exclude a plurality. The mere fact that certain features are claimed in different claims does not exclude the combination thereof. References in the claims are not deemed to be a limitation on the scope of protection.

The invention claimed is:

1. A device for imaging an object by means of electromagnetic high frequency radiation comprising:

at least one source for electromagnetic high frequency radiation forming a beam, wherein the beam has a beam direction;

at least one detector for electromagnetic high frequency radiation; and at least one imaging device for generating a focus, wherein the device for imaging an object has at least one controllable element for changing the beam direction, and wherein the controllable element changing the beam direction comprises a surface of a door member of a revolving door, which is reflecting for the electromagnetic high frequency radiation to be detected.

2. A device according to claim 1 wherein the at least one imaging device is configured to form a plurality of mutually spatially separate beam paths, the foci of which are at a plurality of mutually different locations, and wherein the controllable element changing the beam direction is configured to spatially move the foci of the mutually separate beam paths.

3. A device according to claim 2 wherein the controllable element changing the beam direction further comprises a movable optical element.

4. A device according to claim 3 wherein the movable optical element is a body having a polygonal base surface of which at least one side surface forms a mirror for the radiation used and which is rotatable about an axis.

5. A device according to claim 4 wherein at least one of the side surfaces of the body having a polygonal base surface has a material absorbent for the high frequency radiation used.

6. A device according to claim 4, wherein the body has a triangular base surface.

7. A device according to claim 3 wherein each of the spatially separate beam paths has at least one movable optical element.

8. A device according to claim 2 wherein each of the spatially separate beam paths has an optical travel length between the detector and the focus, wherein the optical travel lengths are all different from each other.

9. A device according to claim 2 wherein each of the spatially separate beam paths has at least one focusing element.

10. A device according to claim 2 wherein the controllable element changing the beam direction further comprises a rotatable or pivotable mirror.

11. A method of imaging an object by electromagnetic high frequency radiation comprising the steps:

emitting a beam of electromagnetic high frequency radiation, wherein the beam has a beam direction imaging the object onto at least one detector with an imaging device which generates a focus;

detecting the imaging with the detector; and controlling an element which changes the beam direction, wherein the element changing the beam direction comprises a surface of a door member of a revolving door, which is reflecting for the electromagnetic high frequency radiation to be detected.

12. A method according to claim 11 and further including the steps of:

imaging the object with a plurality of mutually spatially separate beam paths, the foci of which are at a plurality of mutually different locations, and controlling the element changing the beam direction in such a way that a plurality of foci of the mutually separate beam paths are spatially moved over the object.

* * * * *